United States Patent [19]

Kellogg-Smith

[11] 4,143,518
[45] Mar. 13, 1979

[54] INTERNAL COMBUSTION AND STEAM ENGINE

[76] Inventor: Ogden Kellogg-Smith, Rte. 4, Box 6, Arnold, Md. 21012

[21] Appl. No.: 908,551

[22] Filed: May 22, 1978

Related U.S. Application Data

[63] Continuation of Ser. No. 733,878, Oct. 19, 1976, abandoned.

[51] Int. Cl.² .............................................. F01B 29/04
[52] U.S. Cl. ...................................... 60/712; 123/112; 123/64
[58] Field of Search .......................... 60/625, 712, 618; 123/1 R, 25 D, 25 B, 25 C, 25 P, 64

[56] References Cited

U.S. PATENT DOCUMENTS

| | | | |
|---|---|---|---|
| 754,385 | 3/1904 | Nicodemus | 60/712 |
| 894,682 | 7/1908 | Munden | 60/712 |
| 1,217,788 | 2/1917 | Liedtke | 60/625 |
| 1,965,569 | 7/1934 | Anderson | 60/712 |
| 2,574,103 | 11/1951 | Hefner | 60/712 |
| 2,671,311 | 3/1954 | Rohrbach | 60/712 |
| 3,964,263 | 6/1976 | Tibbs | 60/712 |

FOREIGN PATENT DOCUMENTS

| | | | |
|---|---|---|---|
| 705924 | 4/1941 | Fed. Rep. of Germany | 60/712 |
| 26271 of | 1907 | United Kingdom | 60/712 |

*Primary Examiner*—Ira S. Lazarus
*Attorney, Agent, or Firm*—Arthur Schwartz

[57] ABSTRACT

A six-stroke cycle engine fires a fuel charge for a first power stroke, the exhaust gases being directed to a thermally insulated jacket surrounding the cylinder and having fins and/or baffles to recover heat from the gases and conduct the heat to the inner cylinder wall for converting injected water into steam for a second power stroke. The fins and/or baffles in the jacket also function as a muffler for the engine.

9 Claims, 7 Drawing Figures

INTERNAL COMBUSTION AND STEAM ENGINE

This is a continuation of application Ser. No. 733,878, now abandoned, filed Oct. 19, 1976.

BACKGROUND OF THE INVENTION

This invention is in the field of internal combustion engines and particularly such engines also employing steam to produce power.

It has been previously proposed to construct a six-stroke cycle engine wherein the first four strokes function as a conventional internal cumbustion engine and include an intake stroke, a compression stroke, a power stroke, and an exhaust stroke but including two further strokes before the cycle is completed wherein, after exhaust of the products of combustion from the combustion chamber, water is injected into the combustion chamber to be converted by the heat remaining therein into steam to provide a steam expansion power stroke and a following steam exhaust stroke. Such prior proposals, however, were either of complicated construction or of very low efficiency. In the case of such engines as described in U.S. Pat. No. 1,339,176, the heat of the exhausted products of combustion was entirely lost, resulting in very inefficient operation. Six-stroke cycle engines of the type shown in U.S. Pat. Nos. 1,217,788 and 2,671,311 relied on steam generating means external of the engine itself for providing the steam for a steam expansion power stroke. Obviously, such arrangements were complicated and expensive to produce and introduce more mechanisms through which heat losses are suffered. None of the prior art known to applicant proposes to recover a large part of the heat contained in the products of combustion and return that heat to the combustion chamber for vaporization of injected water during a steam expansion power stroke.

SUMMARY OF THE INVENTION

In general, the present invention comprises a six-stroke cycle engine of the general type discussed above but wherein the products of combustion exhausted from the combustion chamber are directed to a heat exchanging arrangement whereby heat is extracted from those gases and returned directly to the cylinder walls to maintain a high temperature therein and thus recover heat to be used for the vaporization of water into steam.

It is, therefore, an object of this invention to provide such an engine by recovering heat from exhaust gases and efficiently converting such heat into useful work.

Another object is to prvide an arrangement for improving the scavenging of products of cumbustion from the engine cylinders.

A further object is to eliminate the conventional cooling system for an internal combustion engine.

A still further object of the invention is to provide means for recovering heat from the exhaust products of combustion and simultaneously cause such means to act as a muffler for the engine.

BRIEF DESCRIPTION OF THE DRAWINGS

The foregoing and other objects, features and advantages of the invention will become more apparent from the following detailed description and accompanying drawings wherein.

DESCRIPTION OF A PREFERRED EMBODIMENT

Figure 1:
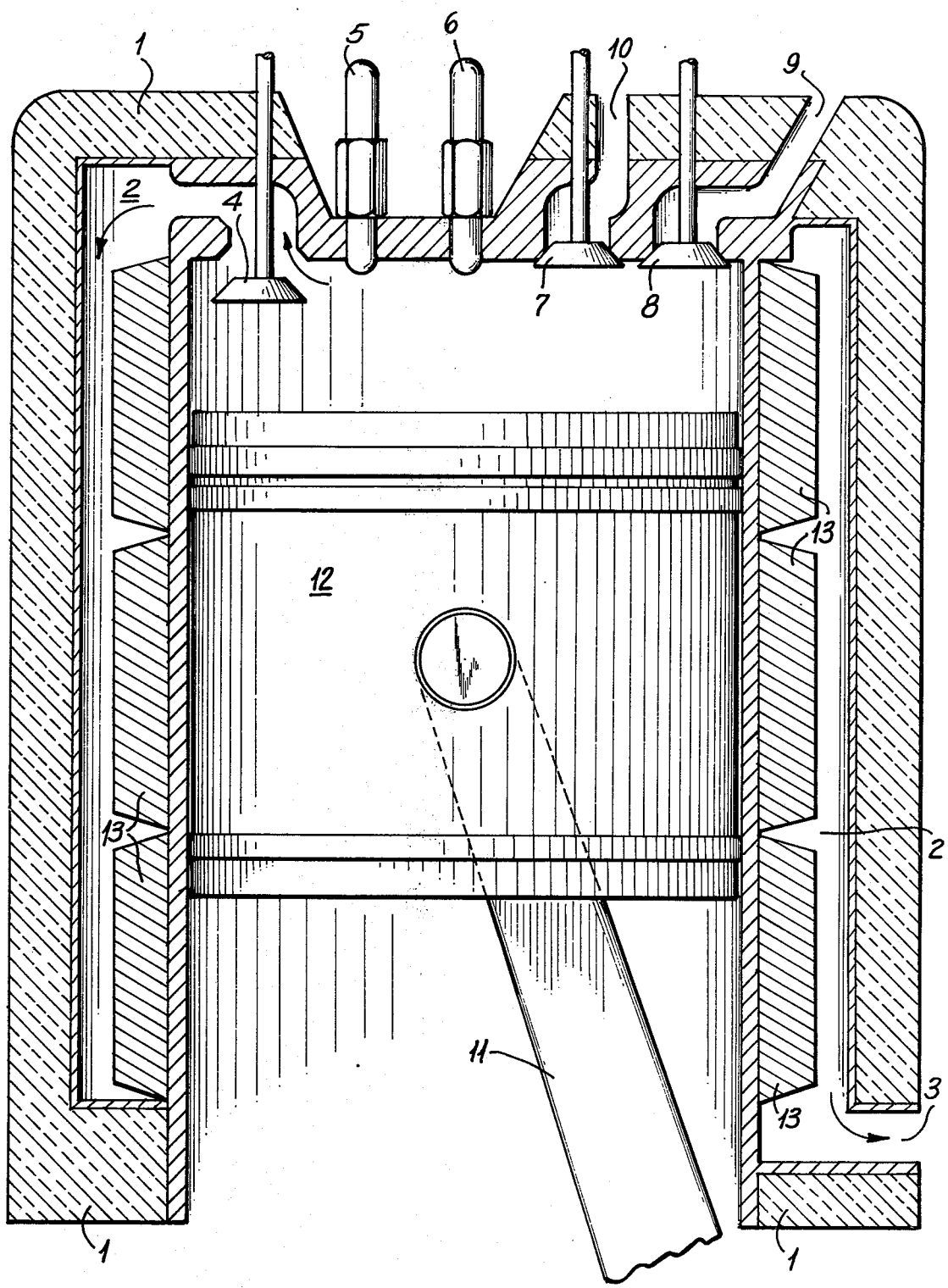
FIG. 1 is a diagrammatic view, partly in cross-section, of an engine according to my invention.

Referring now to FIG. 1, one cylinder of a multicylinder engine is illustrated having a cylinder wall enclosed by thermal insulation 1 of any conventional type. Inside the cylinder wall and within the insulation material 1 is a cylindrical exhaust gas chamber 2 having an exhaust outlet port 3.

Across the top of the cylinder are positioned an exhaust valve 4 communicating with the exhaust gas chamber 2, a steam/water injection nozzle 5 and a spark plug, or alternatively a fuel injection nozzle, 6 are positioned adjacent one another. The engine includes a steam exhaust valve 7, the purpose of which will be seen later, and an intake valve 8 communicating with an air or air-fuel mixture intake 9.

Communicating with the steam exhaust valve 7 is a steam exhaust port 10.

A conventional connecting rod 11 is shown connected to a piston 12 in the illustrated cylinder.

Finally, a plurality of heat transfer protrusions in the form of fins, baffles or other surface-increasing configurations 13 are illustrated as extending from the inner cylinder wall into the exhaust gas chamber 2.

Reference is now made to FIGS. 2-7 to illustrate the operation of the six-stroke cycle engine.

Figure 2:
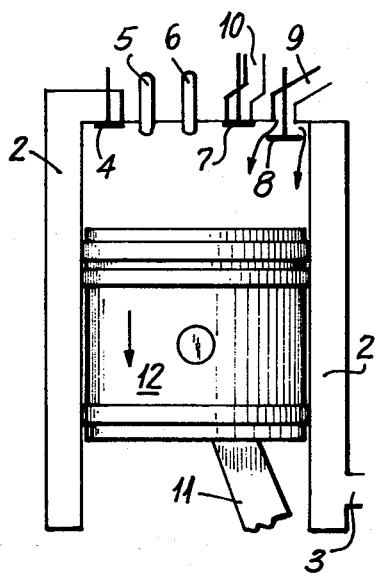
FIGS. 2-7 are schematic views of the device shown in FIG. 1 in different stages of operation.

In FIG. 2, the piston 12 is moving down as in a conventional four-stroke cycle intake stroke. Air or an air-fuel mixture is drawn through chamber 9 into the cyclinder via open intake valve 8.

Figure 3:
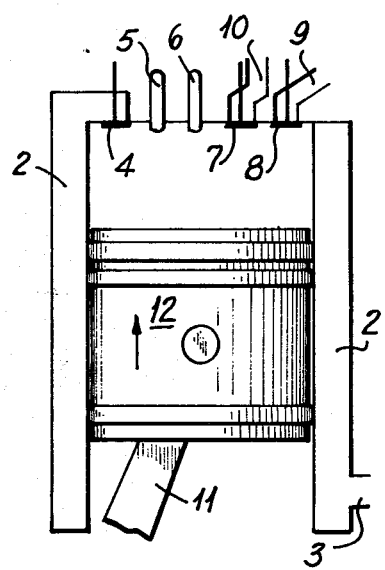

FIG. 3 illustrates the compression stroke where all valves are closed and the piston 12 moves in the upward direction to compress the air-fuel mixture or air.

Figure 4:
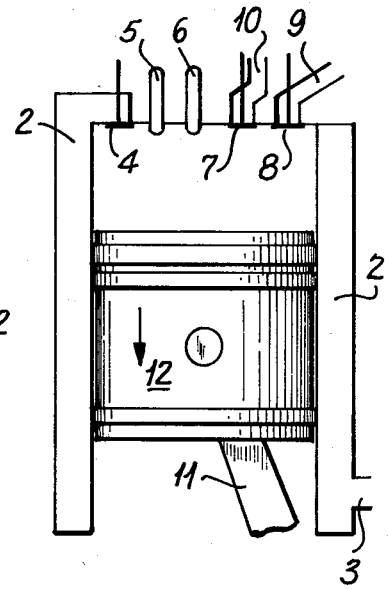

In FIG. 4, the piston is seen moving down as in a conventional four-stroke cycle power stroke, again with all valves closed and after spark plug 6 has been fired or by injecting a charge of fuel, if only air was drawn in on the intake stroke.

In FIG. 5, the piston 12 is again seen moving in the upward direction with exhaust valve 4 in the open position. This valve permits the hot exhaust gases to expand into the hot exhaust gas chamber 2 which surrounds the cyclinder and combustion chamber. The hot gases then leave the engine via exhaust outlet port 3.

Figure 6:
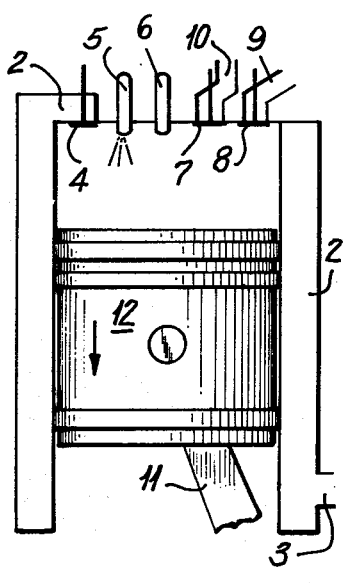

A second power stroke is seen in FIG. 6. The power for the expansion is provided by the expansion of steam from water injected under pressure at an elevated temperature through steam/water injection nozzle 5 after exhaust valve 4 is closed at the end of the exhaust stroke.

Finally, FIG. 7 again illustrates the piston 12 moving in the upward direction with steam exhaust valve 7 in the open position. The expanded steam is exhausted through the valve 7 and out passageway 10. This exhaust may be directed to a conventional condenser, to a muffler system in which it combines with and cools the hot exhaust, or directly to the atmosphere.

It will be appreciated that in the six-stroke cycle there are two power strokes, the second power stroke being specifically illustrated in FIG. 6 and being produced without the addition of further fuel. This increases the efficiency over a conventional four-stroke cycle engine.

Figure 5:
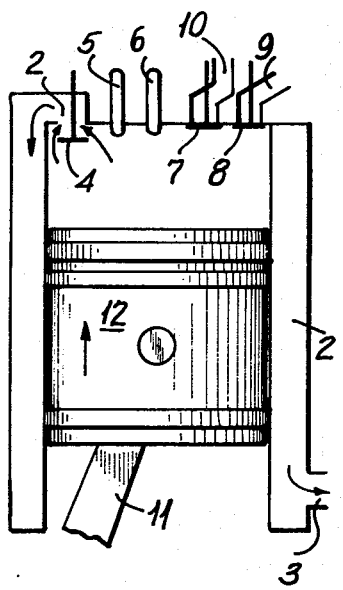
Figure 7:
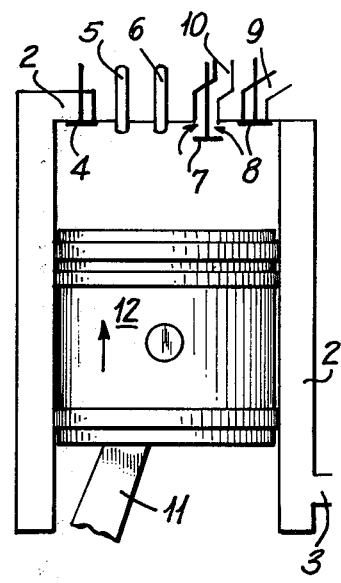

The second exhaust stroke seen in FIG. 7 expels additional portions of the internal combustion residue not expelled in the first exhaust stroke illustrated in FIG. 5.

This arrangement provides for improved scavenging over conventional four-cycle stroke engines.

The cooling of the engine has been improved and simplified by the introduction of water directly into the combustion chamber through nozzle 5 during the portion of the cycle illustrated in FIG. 6. This is accomplished with no external apparatus such as a radiator, fan, cooling fins, pump or other heat exchange system. The amount of water injected may be regulated by a temperature sensor in the cylinder head (not shown), thus admitting water according to the temperature therein in order to assure proper cooling and to assure maximum use of steam for work in the steam power stroke of FIG. 6.

High torque at low speed may also be obtained from the instant invention by means of delaying the spark ignition in spark-ignition operation, or the injection of fuel in a fuel injected system, or both. This will produce less power and more heat for the internal combustion stroke illustrated in FIG. 4, thus making more heat available for the steam power stroke of FIG. 6, with its excellent low-speed high-torque characteristics.

As will be appreciated from reference to FIG. 1, additional retention of heat from the hot exhaust gases will be effected by passing the exhaust into the hot exhaust chamber 2 where it contacts the baffles, fins or other surface increasing means 13. Heat is thus transferred back into the cylinder and combustion chamber wherein it is later utilized to increase the work done in the steam power stroke. The exhaust chamber 2 also operates as a sound muffler, thus reducing the need for an external muffler.

It will also be seen that maximum heat is retained for use in the steam power cycle by the use of the thermal insualtion 1 discussed above in reference to FIG. 1. The heat insulation is placed on the outside of the hot exhaust chamber 2 and in other locations around the cylinder and combustion chamber where it is practical to insulate in order to decrease as much as possible the loss of heat to the atmosphere. The underside of the piston may be provided with thermal insulation and/or a surface that minimizes heat radiation. The whole system for heat recovery for use in the steam power cycle is an integral part of the engine requiring no additional components. The steam exhaust may be conveniently condensed because it is separated from the proeucts of combustion at the source by means of the two exhaust valves.

The total exhaust from the engine will be cleaner than that of a conventional four-stroke cycle engine in terms of work done per pound of fuel consumed. This is due to the increased efficiency of the engine in which the clean exhaust from the steam power stroke of FIG. 7 will dilute the less clean exhaust from the internal combustion power stroke of FIG. 5.

It will also be seen that there will be a water vapor residue in the combustion chamber at the time of combustion. This water residue will be left after the steam exhaust stroke of FIG. 7 and will produce a beneficial effect on the combustion without the use of special injectors. If desired, the water injector 5 may be activated during the internal combustion power stroke of FIG. 4 in the event that more water than that provided by the residue from the steam power stroke and which would be beneficial to the internal combustion stroke.

It will also be noted that the piston 12 can be provided with such configurations, for example, on the top thereof, to increase the heat surface upon which water can be converted to steam in the event that it is decided to use a much larger diameter cylinder than conventionally used in smaller internal combustion engines—or if it is decided to introduce the water into the cylinder at a temperature and pressure insufficient to convert the water to steam immediately as it enters the chamber.

It will be appreciated that the unit may be modified in other ways. For example, the invention illustrated is applicable to a multi-cylinder engine operating on a six-stroke cycle principle; however, a single-cylinder engine has been chosen solely for purposes of illustration. The same principles may be used as a variation of the usual two-stroke cycle engine as follows:

Stroke 1 is a downward internal combustion engine stroke.

Stroke 2 is an upward stroke with the hot exhaust valve open and the intake valve or port closed.

Stroke 3 is a downward steam powered stroke and compression of the air-fuel mixture in the crank case with conventional intake and exhaust ports open near the end of the stroke, thus admitting combustible gases through a bypass from the crankcase and expelling the expanded steam through the exhaust port.

Stroke 4 is an upward compression stroke.

Thus, each down stroke is a power stroke, alternating between internal combustion and steam. Many variations of the above may be used, such as the use of blowers and valves instead of sliding ports, with or without using crankcase compression of the incoming gases.

While one basic embodiment of the invention has been described, it will be understood that it is capable of still further modifications and this application is intended to cover any variations, used, or adaptations of the invention, following in general the principles of the invention and including such departures from the present disclosure as come within knowledge or customary practice in the art to which the invention pertains, and as may be applied to the essential features hereinbefore set forth and falling within the scope of the invention or the limits of the appended claims.

I claim:

1. In a cyclic engine having at least one piston and cylinder provided with means for introducing and firing a fuel-air charge for a first power stroke, means for exhausting hot products of combustion from said cylinder and means for injecting steam/water into said cylinder for a second power stroke, the improvement comprising:

means defining a chamber surrounding said cylinder, said means for exhausting products of combustion from said cylinder being arranged to direct said products into said chamber;

means for conducting heat from said products in said chamber to the inner surface of said cylinder, and an exhaust passage from said chamber.

2. An engine as defined in claim 1 wherein said means for exhausting said products is arranged to direct them into one axial end of said chamber and wherein said exhaust passage extends from the other axial end of said chamber.

3. An engine as defined in claim 1 wherein said chamber is provided with heat conductive protrusions therein for absorbing heat from said products and conducting the same to the inner surface of said cylinder.

4. An engine as defined in claim 2 wherein said protrusions are arranged and configured to further function as muffler means for said engine.

5. An engine as defined in claim 1 including (hermal) insulating means enclosing said cylinder and said means defining said chamber.

6. An engine as defined in claim 1 including means for exhausting steam from said chamber after the second power stroke.

7. A cyclic engine comprising:
 a. a cylinder,
 b. a piston in said cylinder,
 c. means for introducing a charge into the engine for a first power stroke,
 d. means for exhausting hot products of combustion from said cylinder,
 e. means for providing steam in said cylinder for a second power stroke,
 f. a chamber positioned substantially coaxial with said cylinder,
 g. said exhausting means being arranged for directing the hot products into said chamber,
 h. means for conducting heat from the hot products in said chamber, and
 i. an exhaust passage in said chamber for exhausting the hot products.

8. An engine as defined in claim 7 wherein said means for exhausting the hot products is arranged to direct them into one axial end of said chamber and wherein said exhaust passage extends from the other axial end of said chamber.

9. An engine as defined in claim 7 including means for exhausting steam from said chamber after the second power stroke.

* * * * *